No. 714,323. Patented Nov. 25, 1902.
E. M. NICHOLS.
TRAP.
(Application filed Apr. 3, 1902.)
(No Model.)
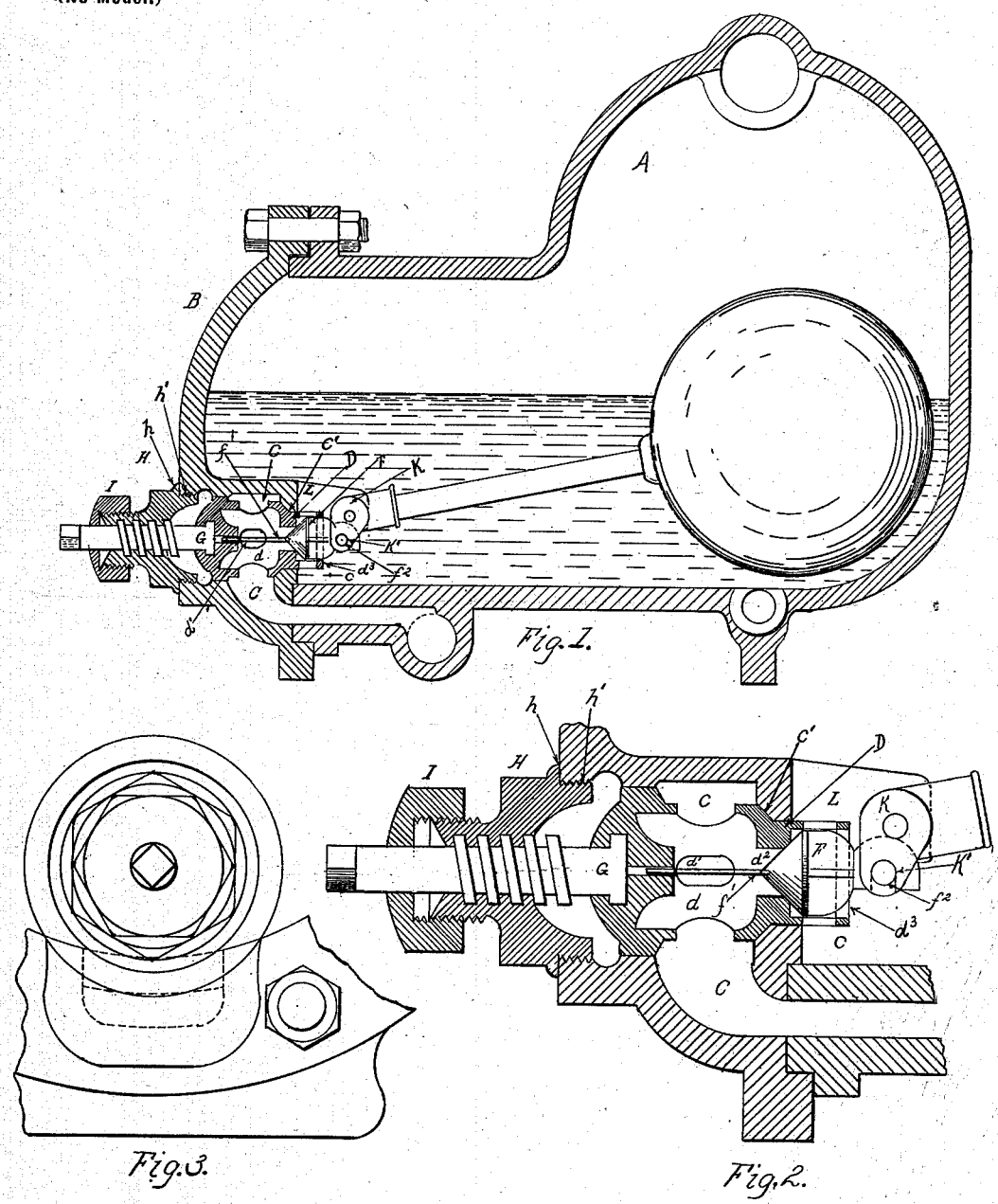
Witnesses
Harriet V. Noble
Charles Garlick
Eugene M. Nichols Inventor

UNITED STATES PATENT OFFICE.

EUGENE M. NICHOLS, OF PHILADELPHIA, PENNSYLVANIA.

TRAP.

SPECIFICATION forming part of Letters Patent No. 714,323, dated November 25, 1902.

Application filed April 3, 1902. Serial No. 101,288. (No model.)

*To all whom it may concern:*

Be it known that I, EUGENE M. NICHOLS, a citizen of the United States, residing in the city of Philadelphia, county of Philadelphia, and State of Pennsylvania, have invented a new and useful Improvement in Steam-Traps; and I hereby declare that the following is a full, clear, and exact description, reference being had to the accompanying drawings.

In the operation of steam-traps it frequently happens that foreign substances become lodged in the automatic-valve mechanism, thereby directly preventing it from properly performing its function and also indirectly by reason of the severe cutting of the valve and seat due to the action of the water under pressure.

The object of the invention is to overcome or prevent these difficulties by providing additional valve means for manually flushing the trap and also by so constructing the device that the entire valve mechanism is easily accessible and renewable.

In the accompanying drawings, Figure 1 is a vertical section of the trap. Fig. 2 is an enlarged vertical section of the valve mechanism with adjacent portions of the casing and chamber. Fig. 3 is an elevation of the valve mechanism.

The trap has a casing A, provided with a head B, bolted thereto. The casing is formed with a drain-passage, which is in alinement with a passage leading from a discharge-chamber C, formed in the head. The discharge-chamber C communicates with the chamber of casing A by means of a passage provided with a valve-seat $c'$. The discharge-chamber is accessible by an opening $h'$, in which is threaded a valve-bonnet H, making a water-tight joint $h$ with the head B.

The discharge-chamber C is provided with a manually-operated valve D, fitting the seat $c'$. This valve is operated by the stem G, loosely connected thereto and screwing in the valve-bonnet H. A gland I serves to pack the stem G. The stem is manually operated by any convenient means and serves to withdraw the valve D from its seat $c'$.

The manually-operated valve D is formed with chamber $d$, discharge-ports $d'$, and an opening $d^2$, providing a seat $d^4$ for an automatically-operated valve F. It is also formed with an annular cage $d^3$, which constitutes, with an axial opening in the opposite end of the valve, a guide and lock for the valve F.

The valve F has an axial guide-rod $f'$, fitting the axial opening in the valve D. It also has fitting the cage $d^3$ webs, one of which has a hook extension, whose opening $f^2$ takes over a pin $k'$ on the bell-crank lever, to which the float is attached. This lever is mounted on a pivot-pin K, secured to lugs L, cast on the head B. It is to be noted that by these means the automatic valve F is detachably and securely locked in operative position.

In assembling the device the automatic valve F is hooked over the crank-pin $k'$. The valve D is next inserted in chamber C, the valve F and its guide-rod $f'$ easily taking in their respective guides. The bonnet H being then screwed in place, the valve D is brought to its seat $c'$ by screwing home its operating-stem G.

In operation the trap, as far as its automatic valve means is concerned, is similar to a simple form of existing trap. The water raises the float, opens the valve F, and discharges through opening $d^2$, chamber $d$, and discharge-ports $d'$ into discharge-chamber C. As the water-level in the trap falls the valve F is closed, so as to prevent escape of steam. Should it become necessary to drain the trap, the valve D is withdrawn from its seat $c'$ by unscrewing the stem G. A positive discharge will thus obtain through opening $d^2$ and around seat $c'$.

When any of the valve parts are to be replaced, the bonnet H is unscrewed, and the stem G and valve D may then be drawn therewith from the head B. Valve F may then be unhooked from crank-pin $k'$ and removed from the trap. The defective parts may then be cleaned or replaced and restored to operative relations.

The stem G and valve D may be made in one piece, if desired, or stem G may be omitted and the valve and bonnet made in one piece.

I am aware that there are traps provided with manually-operated valves to permit of a positive discharge from the casing, and I am also aware that in some of these the manually-operated valve forms a seat for the automatic valve; but I am not aware of any wherein the manually-operated valve forms both a seat and a guide for the automatic valve and which will permit the connecting or disconnecting of the automatic valve from the operating mechanism without disturbing or operating a considerable portion of the device.

Having described my invention, I claim—

1. In combination with a trap, a detachable automatic valve, a manually-operated valve forming a seat, a guide and a lock for the automatic valve.

2. In combination with a trap, an automatic operating device, a valve loosely connected to the operating device, a manually-operated valve forming a seat and a guide for the automatic valve and locking the automatic valve to the operating device.

3. In combination with a trap, an automatic operating device, an automatic valve, a manually-operated valve secured in the trap-head and forming a seat, a guide and a lock for the automatic valve, the automatic valve being removable by detaching the manual valve from the head.

4. In combination with a trap, a casing, a head attached to the casing, a chamber in the head, a valve-seat in the chamber, a detachable automatic valve, a manually-operated valve forming a seat, a guide and a lock for the automatic valve and engaging the seat in the chamber, and means for withdrawing the manual valve from its seat to permit a positive discharge of liquid from the interior of the casing.

EUGENE M. NICHOLS.

Witnesses:
HARRIET V. NOBLE,
CHARLES GARLICK.